United States Patent Office 3,448,199
Patented June 3, 1969

3,448,199
PHTHALALDEHYDE DIOXIMES AS
MICROBIOCIDES
Glentworth Lamb, Trenton, N.J., assignor to American
Cyanamid Company, Stamford, Conn., a corporation of
Maine
No Drawing. Filed Jan. 20, 1966, Ser. No. 521,802
Int. Cl. A61k 27/00; A01n; C07c 131/00
U.S. Cl. 424—327                          3 Claims

ABSTRACT OF THE DISCLOSURE

A method for controlling bacteria and fungi is described in which the bacteria and fungi are contacted with a compound selected from the group consisting of

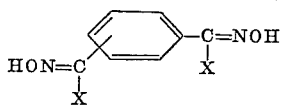

wherein X is chlorine and bromine and the

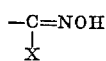

are meta or para to each other.

---

This invention relates to a method of controlling bacteria and fungi. More particularly, the invention relates to a method of protecting environments such as economic crops, textiles, fabrics, liquid mediums and the like from bacterial and fungal attack by contacting said bacteria and fungi with or by applying to the environmental locus thereof a toxic or protective amount of a compound of the formula

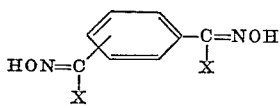

(I)

wherein X is halogen and the

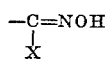

groups are either meta or para to each other on the ring.

The liquid mediums include "process waters," i.e., fresh or saline water utilized in or resulting from various industrial systems such as paper mills, cooling towers, cutting oil and latex paint preparation and use, secondary oil recovery, drilling muds, and other systems in which bacteria and fungi thrive.

The compounds of Formula I above may be prepared in a known manner, e.g., by treating isophthalaldehyde dioxime or terephthalaldehyde dioxime with chlorine, bromine or other halogen or halogen-generating material under controlled temperature conditions, followed by admixture of the treated solution with water and recovery of the desired product therefrom. See Ann. 451 (1927); Chem. Abstracts 56, 11579.

Among the compounds contemplated for use in the method of the instant invention may be mentioned:

Isophthalhydroxamoyl chloride
Isophthalhydroxamoyl bromide
Terephthalhydroxamoyl chloride
Terephthalhydroxamoyl bromide The compounds of Formula I may be employed alone or in admixture with solvents, carriers, and the like. When applied in admixture, the compounds are easily formulated as wettable powders, liquid concentrates, and dusts and dust concentrates which may then be applied by spraying, dusting, soaking or other usual manner with conventional application equipment.

Wettable powders, dusts and dust concentrates are generally prepared by admixing the active ingredient with finely divided solid diluents such as attapulgite, kaolinite, talc, pyrophyllite, diatomaceous earth and the like. Surfactants, spreaders, stickers, emulsifiers and such may be included in these formulations where desirable.

Liquid concentrates may be prepared by dissolving the active ingredients in organic solvents such as toluene, xylene, lower alkyl alcohols, cyclohexanone, glycol ethers, esters or the like with or without the addition of surfactants, emulsifiers, spreaders, stickers and the like. For application, the concentrates are normally diluted with water or with inexpensive organic solvents such as deodorized kerosene, high aromatic oil, and fuel oils.

The finding that the compounds of the invention can be used to protect environments such as economic crops, (i.e., field crops, vegetables, fruits, nuts, ornamentals, forests, etc.), textiles, fabrics, liquid mediums, and the like from bacterial and fungal attack is completely unexpected. Thus, British Patent No. 949,371, published Feb. 12, 1964, discloses compounds of the formula

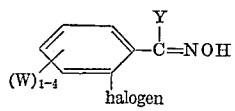

where W is halogen or alkyl and Y is halogen or one of a great variety of oxygen-, nitrogen-, or sulfur-containing groups, not including

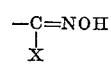

These compounds are said to exhibit pesticidal, fungicidal, herbicidal, and seedicidal properties and high toxicity to snails. Further, fungicidal and non-phytotoxic properties of compounds of the formula

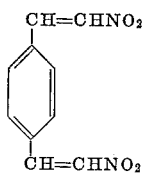

are disclosed in U.S. Patent No. 3,105,004, issued Sept. 24, 1963. It is therefore evident that these disclosures teach away from the instant invention since the aforementioned U.S. patent suggests that a CH=CH group in the substituents on the ring is essential for non-phytotoxicity while retaining fungitoxicity.

The unexpectancy of the combination of good fungicidal or bactericidal activity of the compounds of the invention with non-phytotoxicity is evidenced further by the fact that compounds of the formulas

and

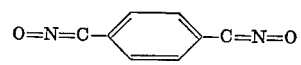

are ineffective as fungicides or bactericides.

The examples set forth below serve further to describe but not necessarily to limit the invention, and to particularly point out the critical nature of the ring substitution. All parts and percentages are by weight unless otherwise stated.

EXAMPLE 1

Apple scab protection test

The effectiveness of the compounds of the instant invention for controlling *Venturia inaequalis*, the causitive agent of apple scab, is demonstrated by the following test wherein the apple trees are sprayed to run off with solutions of test compounds in 50/50 acetone/water mixtures at the rates of 1 lb./100 gal. and ½ lb./100 gal. The spray application is then allowed to dry before inoculating the trees with conidia of *Venturia inaequalis* obtained from sporulating apple leaves. The inoculated trees are held at 100% relative humidity at 72° F. for four days, then placed in the greenhouse where they are examined and the readings recorded 14 days after inoculation. As shown in Table I below, the compounds of the invention are highly effective for controlling apple scab. In substantially the same test, the non-halogenated analog of said compounds are shown to be relatively less effective.

TABLE I

| Compound | Disease Rating | |
|---|---|---|
| | ½ lb./100 gal. | 1 lb./100 gal. |
| Cl-C(=NOH)-⟨C6H4⟩-C(=NOH)-Cl | Clean—no lesions | Clean—no lesions. |
| Cl-C(=NOH)-⟨C6H4⟩-C(=NOH)-Cl (ortho isomer) | ......do............ | Do. |

EXAMPLE 2

Cucumber anthracnose and tomato late blight protection test

The critical nature of the halogen substitution in the compounds of the instant invention is demonstrated by the following tests wherein the effectiveness of said compounds for controlling *Colletotrichum lagenarium*, the cucumber anthracnose pathogen, and *Phytophthora infestans*, the tomato late blight pathogen, is compared with the non-halogenated analogs. In the tests the plants are sprayed to run off with solutions of the test compounds in 50/50 acetone/water mixtures at the rates of 500, 100, 50 and 25 p.p.m. and then allowed to dry. After drying, the plants are inoculated with a mixed suspension of *Colletotrichum lagenarium* and *Phytophthora infestans* and placed in a humidity cabinet maintained at 100% relative humidity and 62° F. for 48 hours. At the end of this 48 hour incubation period, the plants are removed to the greenhouse where they are held for an additional four days. Six days after inoculation, all plants are examined for disease symptoms. The results appear in Table II below.

татBLE II

| Compound | Disease Rating—Anthracnose | | | | Disease Rating—Late Blight | | | |
|---|---|---|---|---|---|---|---|---|
| | 500 p.p.m. | 100 p.p.m. | 50 p.p.m. | 25 p.p.m. | 500 p.p.m. | 100 p.p.m. | 50 p.p.m. | 25 p.p.m. |
| Cl-C(=NOH)-⟨C6H4⟩-C(=NOH)-Cl | Clean | Clean | Clean | Moderate | Clean | Clean | Slight | Severe. |
| HON=CH-⟨C6H4⟩-CH=NOH | Trace | Moderate | Severe | Severe | Slight | Moderate | Severe | Severe. |
| O=N=C-⟨C6H4⟩-C=N=O | Severe | Severe | | | Severe | Severe | | |

EXAMPLE 3

Agar dilution plates

The antifungal activity of the compounds of the invention is demonstrated in the following tests wherein the candidate compounds are incorporated in Difco Sabourand's agar at the rates of 100, 25, 10, 5 and 1 p.p.m. and the agar poured into separate petri dishes and permitted to harden. These prepared agar plates are then inoculated with arganisms: *Aspergillus flavus*; *Cladosporium resinae*; *Fusarium moniliforme*; *Penicillium citrinum*; *Bacillus cereus*; and *Pseudomonas solanacearum*, and incubated for 48 hours. After incubation the plates are examined and readings are made and recorded. Table III below shows the results of this test.

TABLE III

| Compound | Minimum Inhibitory Concentration | | | | | |
|---|---|---|---|---|---|---|
| | *Aspergillus flavus* | *Cladosporium resinae* | *Fusarium moniliforme* | *Penicillium citrinum* | *Bacillus cerens* | *Pseudomonas solanacearum* |
| Cl-C(=NOH)-⟨C6H4⟩-C(=NOH)-Cl | 100 | 25 | 100 | 100 | >100 | 100 |
| Cl-C(=NOH)-⟨C6H4⟩-C(=NOH)(Cl) (ortho) | 100 | 50 | 100 | 50 | 100 | >100 |

EXAMPLE 4

Pea seed protection

Seed protection against soil-born diseases such as *Rhizoctonia sp., Fusarium sp.* and *Pythium sp.* is demonstrated with the compounds of the instant invention by the following test wherein pea seeds are treated with 33⅓% dusts on Attaclay S.F. at actual rates of 4 oz./100 lbs.; 2 oz./100 lbs. and 1 oz./100 lbs. These treated seeds are planted in naturally infested soil and allowed to germinate and grow for 14 days. After 14 days, stand counts are made and the results recorded below in Table IV.

TABLE IV

| Compound | Percent Stand Peas | | |
|---|---|---|---|
|  | 4 oz./ 100 lbs. | 2 oz./ 100 lbs. | 1 oz./ 100 lbs. |
| 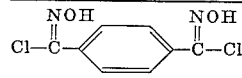 | 80 | 20 | 20 |
| Untreated infested control | 10 | 10 | 10 |

EXAMPLE 5

Phytocidal test

The critical nature of the halogen substitution in the compounds of the invention is further demonstrated by the following tests designed to determine and compare the phytotoxicity of the compounds of the invention with closely related analogs. These tests are carried out with seeds of wheat and radish. Solutions of the compounds are made up at 1000 p.p.m. concentrations. Ten milliliters of each of these solutions is mixed with 10 ml. of plain water agar (to yield 500 p.p.m.) in each of two separate sets of two 2 oz. wide-mouth bottles. When the agar solidifies, seeds of wheat and seeds of radish are placed on the surface of the appropriate agar suspensions. The bottles are covered and allowed to stand three weeks before readings are made on the condition of the plants in comparison with untreated controls. The results follow in Table V below and show the non-phytotoxicity of the compounds of the invention as compared to related compounds.

TABLE V

| Compound | Wheat | Radish |
|---|---|---|
| 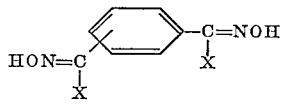 | No effect | No effect. |
| 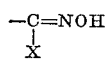 | Dead | Dead. |
| HO—N=CH—〈 〉—CH=N—OH | do | Do. |

I claim:
1. A method of controlling bacteria and fungi which comprises contacting said bacteria and fungi with an effective amount of a compound selected from the group consisting of

$$\text{HON=C}\underset{X}{|}\text{—}\bigcirc\text{—}\underset{X}{\overset{|}{\text{C=NOH}}}$$

wherein X is chlorine or bromine and the $$\underset{X}{\overset{|}{\text{—C=NOH}}}$$

groups are meta or para to each other.

2. The method of claim 1 wherein the compound is isophthalhydroxamoyl chloride.

3. The method of claim 1 wherein the compound is terephthalhydroxamoyl chloride.

References Cited

UNITED STATES PATENTS

| | | | |
|---|---|---|---|
| 2,302,384 | 11/1942 | Horst | 167—30 |
| 2,963,399 | 12/1960 | Bluestone | 167—30 |
| 3,073,739 | 1/1963 | Lamb et al. | 167—30 |
| 3,105,004 | 9/1963 | Pyne. | |
| 3,146,086 | 8/1964 | Bluestone et al. | 167—30 |
| 3,223,733 | 12/1965 | Heiss et al. | 260—566 |
| 3,234,255 | 2/1966 | Hackmann et al. | 167—30 |
| 3,251,760 | 5/1966 | Holtschmidt et al. | 167—22 |

OTHER REFERENCES

Ricca: Synthesis of Polyphenyloxazoles.

LEWIS GOTTS, *Primary Examiner.*

G. HOLLRAH, *Assistant Examiner.*

U.S. Cl. X.R.

260—566